United States Patent
Ono et al.

(10) Patent No.: US 8,728,431 B2
(45) Date of Patent: May 20, 2014

(54) METHOD OF PREPARING CARBON NANOTUBES AND CATALYST FOR PRODUCING CARBON NANOTUBES

(75) Inventors: Takashi Ono, Kanagawa (JP); Isao Hirano, Kanagawa (JP); Satoshi Fujimura, Kanagawa (JP); Kimihisa Yamamoto, Tokyo (JP); Takane Imaoka, Tokyo (JP)

(73) Assignees: Tokyo Ohka Kogyo Co., Ltd., Kawasaki-shi (JP); Tokyo Institute of Technology, Tokyo (JP)

( * ) Notice: Subject to any disclaimer, the term of this patent is extended or adjusted under 35 U.S.C. 154(b) by 0 days.

(21) Appl. No.: 13/484,048

(22) Filed: May 30, 2012

(65) Prior Publication Data

US 2012/0308470 A1 Dec. 6, 2012

(30) Foreign Application Priority Data

Jun. 1, 2011 (JP) .................................. 2011-123683
Apr. 10, 2012 (JP) .................................. 2012-089152

(51) Int. Cl.
*D01C 5/00* (2006.01)
(52) U.S. Cl.
USPC ........................................ 423/447.3; 977/843
(58) Field of Classification Search
USPC ............. 423/447.1, 447.3; 502/200; 977/742, 977/842
See application file for complete search history.

(56) References Cited

U.S. PATENT DOCUMENTS

2008/0280751 A1* 11/2008 Harutyunyan et al. ......... 502/87

FOREIGN PATENT DOCUMENTS

JP 2009-196873 9/2009

OTHER PUBLICATIONS

Dendrimer-Assisted Self-Assembled Monolayer of Iron Nanoparticles for Vertical Array Carbon Nanotube Growth Noe T. Alvarez, Alvin Orbaek, Andrew R. Barron, James M. Tour, and Robert H. Hauge ACS Applied Materials & Interfaces 2010 2 (1), 15-18.*
Enoki, O. et al. "One-Step Synthesis of a Platinum Nanoparticle with Carbon Materials Using a Phenylazomethine Dendrimer as a Template".*
Low-Temperature Growth of Carbon Nanotubes from the Catalytic Decomposition of Carbon Tetrachloride Jason K. Vohs, Jonathan J. Brege, Jeffery E. Raymond, Allan E. Brown, Geoffrey L. Williams and Bradley D. Fahlman Journal of the American Chemical Society 2004 126 (32), 9936-9937.*
Dendrimer-Templated Fe Nanoparticles for the Growth of Single-Wall Carbon Nanotubes by Plasma-Enhanced CVD Placidus B. Amama, Matthew R. Maschmann, Timothy S. Fisher, and Timothy D. Sands The Journal of Physical Chemistry B 2006 110 (22), 10636-10644.*

* cited by examiner

*Primary Examiner* — Stanley Silverman
*Assistant Examiner* — Richard M Rump
(74) *Attorney, Agent, or Firm* — Knobbe Martens Olson & Bear LLP

(57) ABSTRACT

A method for preparing carbon nanotubes including attaching a catalyst consisting of a compound in which a transition metal element of Group 8, 9 or 10 is coordinated to a nitrogen-containing dendrimer compound having at least one nitrogen atom, to which a metal element may be coordinated, on a surface of a substrate, and thermally decomposing a carbon compound in the vicinity of the substrate while supplying the carbon compound on the surface of the substrate to which the catalyst is attached. The catalyst for producing the carbon nanotubes is a compound in which a transition metal element of Group 8, 9 or 10 is coordinated to a nitrogen-containing dendrimer compound having at least one nitrogen atom to which a metal element may be coordinated.

3 Claims, No Drawings

METHOD OF PREPARING CARBON NANOTUBES AND CATALYST FOR PRODUCING CARBON NANOTUBES

RELATED APPLICATIONS

This application claims priority under 35 U.S.C. §119(a)-(d) to Japanese Patent Application No. 2011-123683, filed Jun. 1, 2011; and Japanese Patent Application No. 2012-089152, filed Apr. 10, 2012, the entire contents of which are incorporated herein by reference.

BACKGROUND OF THE INVENTION

1. Field of the Invention

The present invention relates to a preparation method of carbon nanotubes and a catalyst for producing carbon nanotubes.

2. Related Art

Carbon nanotube is a material in which a six-membered ring network composed of carbon atoms is formed in a tubular shape. Recently, carbon nanotube which shows unique electronic behavior, characteristics that carbon nanotube is light weight and about 20 times stronger than steel, and the like have drawn attention, and thus the application of carbon nanotubes to the electronics field, the structural material field or the like has been expected.

As the application of carbon nanotubes to the electronics field, the application to field emission display (FED), flat fluorescent tubes, cathode devices between the cold cathodes and the like has been suggested based on characteristics of emitting electrons, for example, if an electric field is applied to the carbon nanotubes. In the case of these uses, dense and uniform emission of electrons is required, and thus it is necessary to uniformly arrange carbon nanotubes on the surface of a substrate.

As one of the methods for arranging carbon nanotubes to be formed on the surface of a substrate, Patent Document 1 suggested a method that iron chloride, which is a catalyst for forming carbon nanotubes, is carried on the surface of a substrate on which carbon nanotubes are formed and subsequently, carbon nanotubes are grown on the surface of the substrate by a chemical vapor deposition (CVD) method, which supplies the gas of hydrocarbon while the substrate is being heated. By this method, heating allows iron chloride, which is a catalyst, to be vaporized by sublimation from the surface of the substrate, and carbon nanotubes produced in the vapor phase by the vaporized catalyst are formed on the surface of the substrate.

Patent Document 1: Japanese Patent Application Laid-Open No. 2009-196873

SUMMARY OF THE INVENTION

However, when electrons are emitted from carbon nanotubes, it is known that as the carbon nanotubes formed on the surface of the substrate become thinner, the electric field may be concentrated to efficiently emit electrons. For this reason, ideally, it is said to be preferable that carbon nanotubes are arranged into a nano-level pitch on the surface of a substrate. However, in the methods in the related art, carbon nanotubes may not be formed in the state thus controlled, and pitches of carbon nanotubes are not constant, and thus a plurality of carbon nanotubes are often formed while entangled with each other, or formed in a state in which the wall portion of carbon nanotubes is not a single layer, but a multilayer. In this case, a plurality of carbon nanotubes formed becomes a bundle or each carbon nanotube becomes thick, and thus the carbon nanotubes are slightly deteriorated in terms of capacity to emit electrons.

The present invention has been made in consideration of the above situation, and an object thereof is to provide a method for forming a single layer of carbon nanotubes in a state of being arranged into a predetermined pitch by a vapor deposition method and a catalyst for producing carbon nanotubes used by such a method.

The present inventors have intensively studied in order to solve the above problem, and, as a result, found that by attaching a catalyst consisting of a compound in which a transition metal element of 8, 9 or 10 Group is coordinated to a nitrogen-containing dendrimer compound having at least one nitrogen atom, to which a metal element may be coordinated, on the surface of a substrate, and then supplying a carbon source to the surface of the substrate while heating the surface thereof, the transition metal element coordinated to the dendrimer compound has become a growth point of carbon nanotubes and the growth of carbon nanotubes may be controlled at an atom level, thereby completing the present invention. Carbon nanotubes manufactured in this manner are independently growing from each catalyst having a size of nanometer order, and thus a single layer is also formed in a state in which each carbon nanotube is independent, and it is possible to suppress a plurality of carbon nanotubes from being entangled with each other or from being formed in a state in which the carbon nanotubes become a multilayer.

A first aspect of the present invention is a preparation method of carbon nanotubes, including a catalyst attachment process of attaching a catalyst consisting of a compound in which a transition metal element of 8, 9 or 10 Group is coordinated to a nitrogen-containing dendrimer compound having at least one nitrogen atom, to which a metal element may be coordinated, to a surface of a substrate and a thermal decomposition process of thermally decomposing a carbon compound in the vicinity of the substrate while supplying the carbon compound on the surface of the substrate to which the catalyst is attached.

Further, a second aspect of the present invention is a catalyst for producing carbon nanotubes consisting of a compound in which a transition metal element of 8, 9 or 10 Group is coordinated to a nitrogen-containing dendrimer compound having at least one nitrogen atom to which a metal element may be coordinated.

According to the present invention, a method for forming a single layer of carbon nanotubes in a state of being arranged into a predetermined pitch by a vapor deposition method and a catalyst for producing carbon nanotubes used by such a method are provided.

DETAILED DESCRIPTION OF THE INVENTION

Preparation Method of Carbon Nanotubes

Hereinafter, an embodiment of a preparation method of carbon nanotubes according to the present invention will be described. The preparation method of carbon nanotubes of the present invention includes a catalyst attachment process and a thermal decomposition process. Carbon nanotubes formed on the surface of the substrate, which have been subjected to these processes, become a state in which a single layer of carbon nanotubes are arranged into a predetermined pitch. Hereinafter, these processes will be described.

Catalyst Attachment Process

The catalyst attachment process is a process of attaching a catalyst consisting of a compound in which a transition metal element of 8, 9 or 10 Group is coordinated to a nitrogen-containing dendrimer compound having at least one nitrogen atom to which a metal element may be coordinated, on the surface of a substrate.

The catalyst used in the process is a compound in which a nitrogen-containing dendrimer compound is used as a base substance and a transition metal element of 8, 9 or 10 Group (hereinafter, simply referred to as "metal element") showing the catalytic action is coordinated to the base substance. The nitrogen-containing dendrimer compound is a relatively large molecule (about 4 nm in diameter) as a single molecular compound, and has a plurality of nitrogen atoms, to which a metal element may be coordinated in the molecule, at a predetermined interval. For this reason, the nitrogen-containing dendrimer compound may dispose a plurality of metal elements regularly atom by atom in the size of a relatively large molecule as a single molecular compound.

In addition, the nitrogen atoms included in the nitrogen-containing dendrimer compound do not all have a coordination ability equivalent to the metal element, and have a coordination ability as high as that of nitrogen atoms present at the central part of the nitrogen-containing dendrimer compound. For this reason, when a plurality of metal elements is coordinated to the nitrogen-containing dendrimer compound, the metal elements are first filled from the coordination point present at the central part of the nitrogen-containing dendrimer compound, and then the metal elements are filled in order from the coordination point present on the central part side thereof to the coordination point present on the outer side thereof. The use of this characteristic further enables the metal element to be disposed at a desired position by controlling a molar ratio of the nitrogen-containing dendrimer compound and the metal element, for example, when the metal element is coordinated to the nitrogen-containing dendrimer compound.

As the nitrogen-containing dendrimer compound, a phenyl azomethine dendrimer compound represented by the following general formula (1) may be preferably exemplified.

$$AB_nR_m \quad (1)$$

A in general formula (1) is a core molecular group of the phenyl azomethine dendrimer, and the phenyl azomethine dendrimer molecule grows a linkage of unit represented by B in general formula (1) to the outer side from the core molecular group as a center. As a result, the phenyl azomethine dendrimer molecule after growth has a structure in which the B is linked and radially grown from the A as a center. The number that B is linked refers to the "generation", the generation adjacent to the core molecular group A is a first generation, and the generation number increases toward the outer side. A in general formula (1) is represented by a structure of the following formula, $$R^1(-N=)_p$$

and $R^1$ represents an aromatic group that may have a substituent, and p represents the number of bonds to $R^1$.

B in general formula (1) is represented by a structure of the following formula:

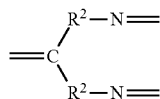

in which one azomethine bond is formed for the A, and $R^2$ represents an aromatic group that may have the same or different substituent. B constitutes the generation of the phenyl azomethine dendrimer, and B which is directly bound to the core molecular group A becomes a first generation.

R in general formula (1) is represented by a structure of the following formula:

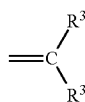

in which an azomethine bond is formed to B as a terminal group, and $R^3$ represents an aromatic group that may have the same or different substituent. R is positioned at a terminal of a structure in which the phenyl azomethine dendrimer molecule is radially grown.

In general formula (1), n represents the generation number through a structure of B of the phenyl azomethine dendrimer, m represents the number of terminal groups R of the phenyl azomethine dendrimer, m=p when n=0, and m=$2^n$p when n≥1.

Each of $R^1$, $R^2$ and $R^3$, which are an aromatic group that may have a substituent, may be independently a phenyl group or a similar structure thereof as a backbone structure, and examples thereof include various groups, such as a phenyl group, a biphenyl group, a biphenyl alkylene group, a biphenyl oxy group, a biphenyl carbonyl group, a phenyl alkyl group and the like. In these backbones, as a substituent, a halogen atom such as a chlorine atom, a bromine atom, a fluorine atom and the like, an alkyl group such as a methyl group, an ethyl group and the like, a haloalkyl group such as a chloromethyl group, a trifluoromethyl group and the like, an alkoxy group such as a methoxy group, an ethoxy group and the like, an alkoxyalkyl group such as a methoxyethyl group and the like, various substituents, such as an alkylthio group, a carbonyl group, a cyano group, an amino group, a nitro group and the like are exemplified. The backbone may have any one or a plurality of these substituents.

Among the substituents, a substituent having high electron donating property, such as a methoxy group and an amino group, or a substituent having high electron accepting property, such as a cyano group and a carbonyl group, is preferred.

In the core portion represented by the formula $R^1(-N=)_p$, p is not particularly limited, but may be, for example, an integer of from 1 to 4. Furthermore, the generation number n of the phenyl azomethine dendrimer is an integer of 0 or 1 or more, but for example, 2 to 6 is preferably exemplified.

One form of the phenyl azomethine dendrimer compound may be a compound represented by the following formula. The compound represented by the following formula is a phenyl azomethine dendrimer compound having a generation number of 4.

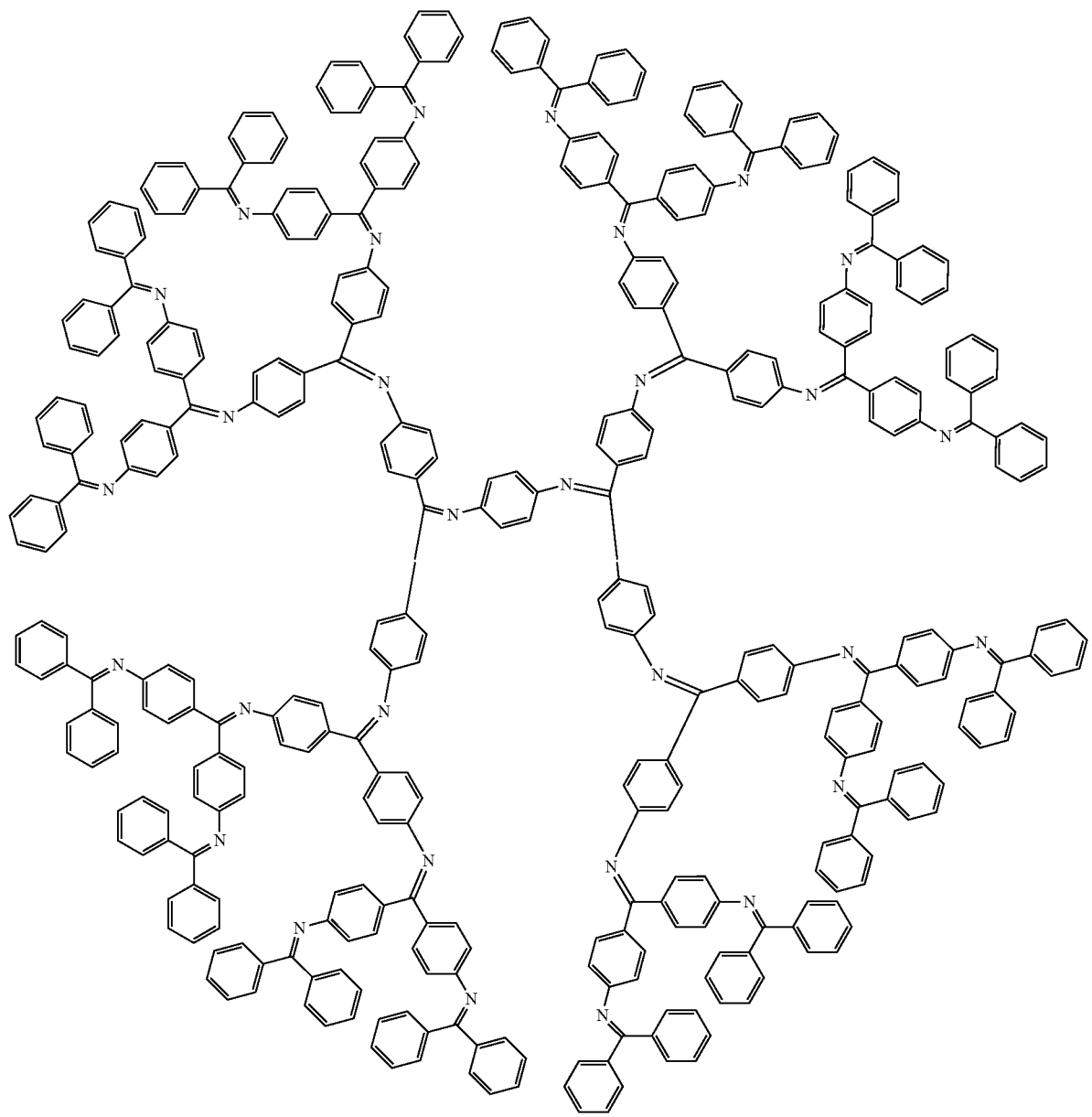

As already described, if a metal salt is added to a phenyl azomethine dendrimer compound represented by the above formula, the metal element is coordinated to a nitrogen element of the phenyl azomethine dendrimer compound, and accepted inside the phenyl azomethine dendrimer compound. In this case, the metal element is preferentially coordinated to a nitrogen atom on the central part side of the phenyl azomethine dendrimer compound and thus is coordinated in order from the nitrogen atom present on the central part side thereof to the nitrogen atom present on the outer side thereof. For this reason, a metal element may be disposed at a desired position of a phenyl azomethine dendrimer compound by controlling a molar ratio of the phenyl azomethine dendrimer compound and the metal element.

For example, an example of adding 2 equivalents of the metal element to the phenyl azomethine dendrimer compound represented by the above formula and an example of adding 6 equivalents of the metal element are represented by the following formula. Further, in the following formula, the metal element coordinated to the phenyl azomethine dendrimer compound is represented by a black circle.

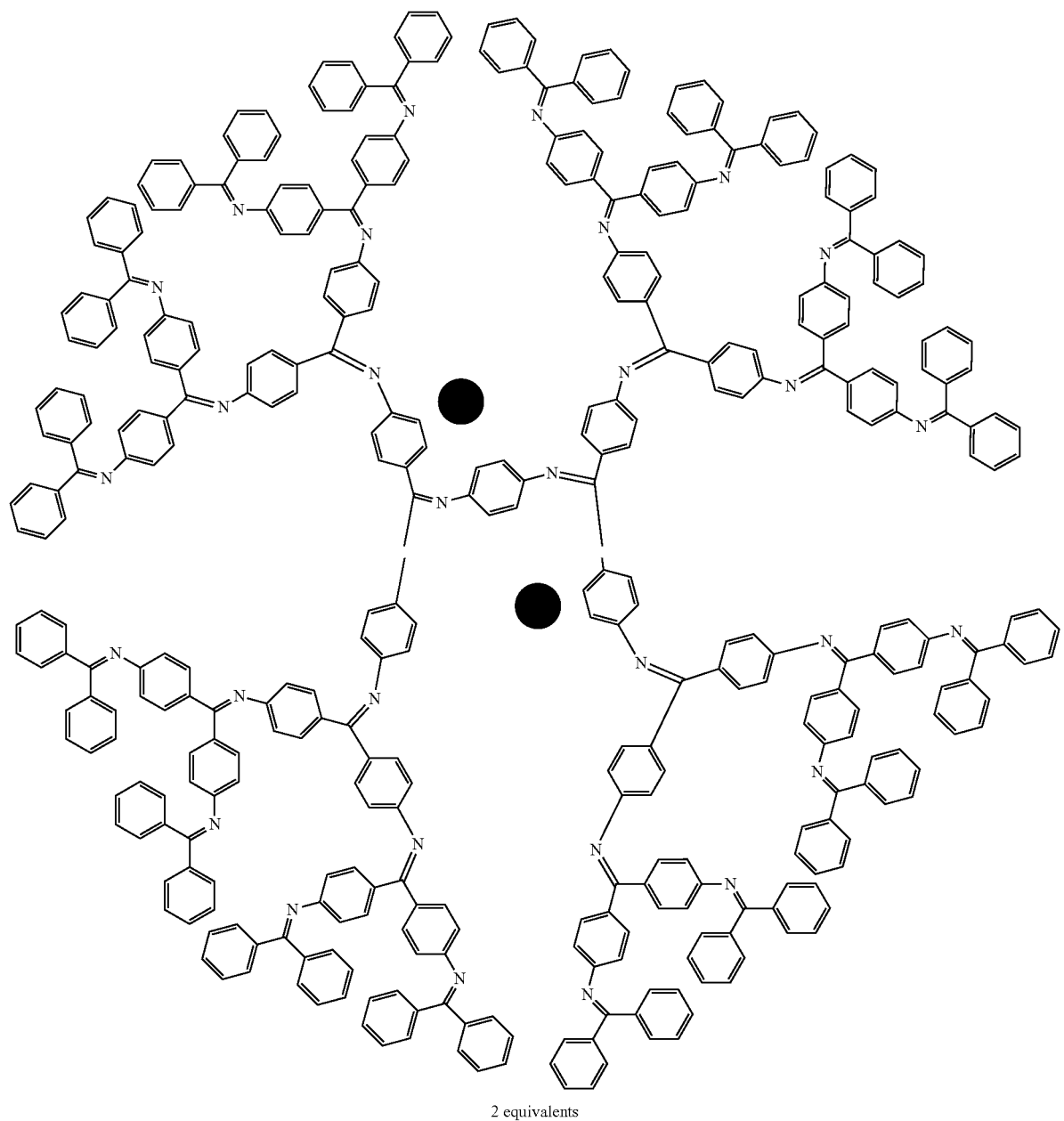
2 equivalents

-continued

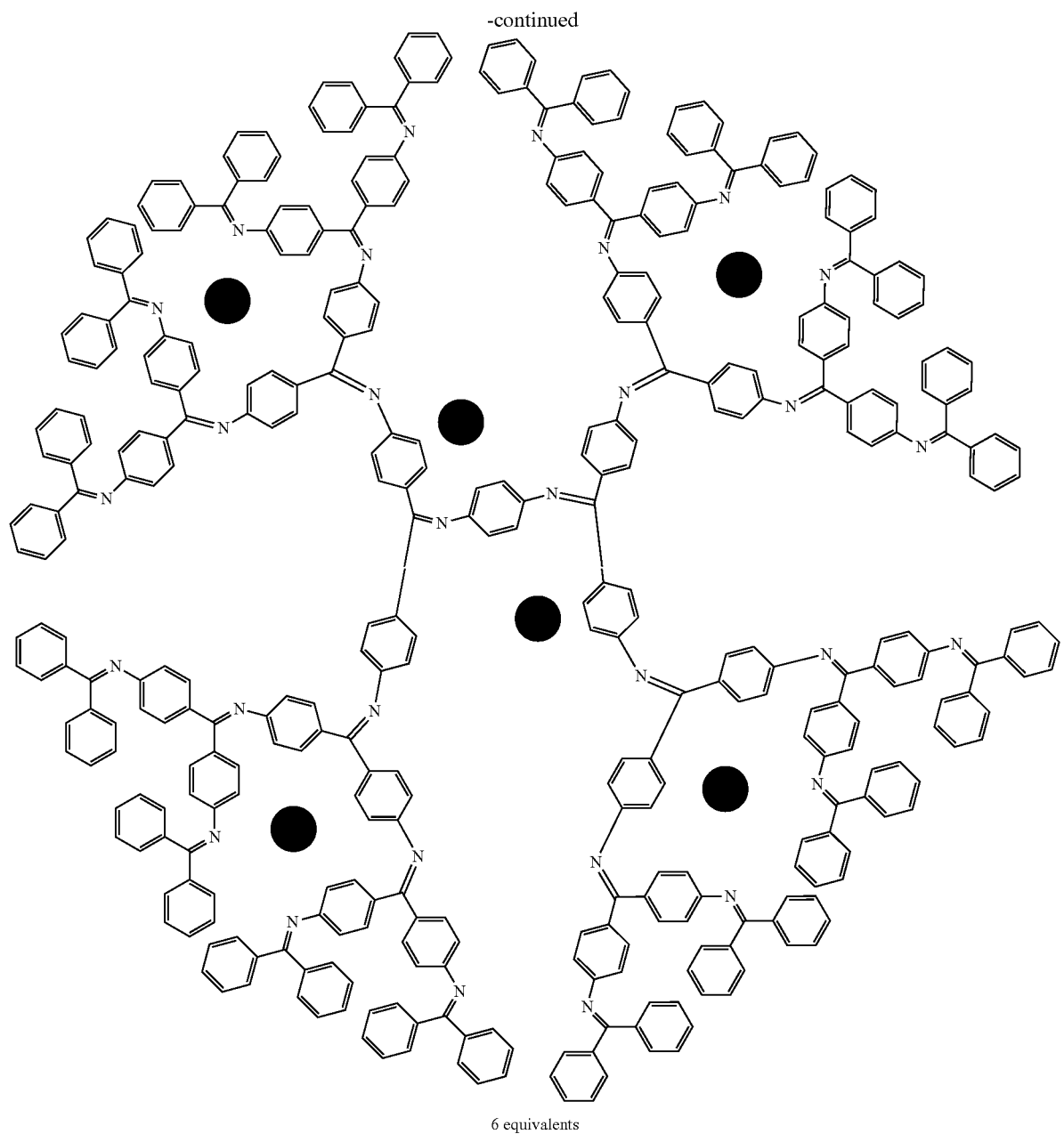

6 equivalents

Each metal element (each black circle in the above formula) coordinated to the nitrogen atom of the phenyl azomethine dendrimer compound respectively has a catalytic activity which forms carbon nanotubes, and thus carbon nanotubes may be grown in a point, in which each metal element is present, as a base point. As described above, the point in which the metal element may be coordinated in the phenyl azomethine dendrimer compound is limited to a specific point, and thus the metal element coordinated to the phenyl azomethine dendrimer compound is disposed into a predetermined pitch at a nano-level. For this reason, if a phenyl azomethine dendrimer compound, to which a metal element is coordinated, is used as a catalyst, carbon nanotubes may be produced into a predetermined pitch at a nano-level. In addition, the upper limit number of metal elements which may be coordinated to one phenyl azomethine dendrimer compound may be arbitrarily changed by increasing or decreasing the generation number of the phenyl azomethine dendrimer compound.

In order to synthesize the phenyl azomethine dendrimer, known methods may be used. Examples of these methods include a method of reacting benzophenone with diaminobenzophenone in a chlorobenzene solvent in the presence of titanium chloride and a base and sequentially reacting the resulting solution with diaminobenzophenone to increase the generation number, but are not limited thereto.

Subsequently, the metal element which is coordinated to the nitrogen-containing dendrimer compound will be described. The metal element which is coordinated to the nitrogen-containing dendrimer provides a catalytic action for producing carbon nanotubes, and is an element of 8, 9 or 10 Group. Such a metal element may include iron, ruthenium, osmium, cobalt, nickel, rhodium, iridium, palladium, platinum and the like, but among them, iron is preferably used.

Examples of the method for coordinating a metal element to a nitrogen-containing dendrimer compound include a method for adding an acetonitrile solution of ferrous chloride ($FeCl_2$), ferric chloride ($FeCl_3$) or the like to a nitrogen-containing dendrimer compound dissolved in an organic solvent, but are not particularly limited thereto. In this case, examples of the molar ratio of the nitrogen-containing dendrimer compound and the metal element include the nitrogen-containing dendrimer compound: the metal element=1:1 to 30, but may be suitably set in consideration of a desired production density of carbon nanotubes. Furthermore, if the mole number of the metal element coordinated to 1 mole of the nitrogen-containing dendrimer compound is reduced, the diameter of carbon nanotubes produced tends to be decreased.

Subsequently, a catalyst obtained by coordinating the metal element to the nitrogen-containing dendrimer compound is attached to the surface of a substrate which produces carbon nanotubes. The substrate is not particularly limited, but may be suitably selected in consideration of a desired use and the like. Examples of the substrate include a silicon substrate, a glass substrate, a highly oriented pyrolytic graphite (HOPG) substrate, a silicon nitride substrate, a quartz substrate and the like.

The method for attaching a catalyst to the surface of a substrate is not particularly limited, and known methods may be suitably used. An example of the methods is a method for applying a solution including a catalyst on the surface of a substrate by means such as, for example, a spin coat method and the like and drying the substrate.

Suitable examples of a solvent used in preparation of a catalytic solution including a nitrogen-containing dendrimer coordinating a predetermined amount of a metal element include a chlorine-containing organic solvent such as dichloromethane, chloroform, 1,2-dichloroethane, 1,1-dichloroethane, carbon tetrachloride and the like, an aromatic organic solvent such as benzene, toluene, xylene, chlorobenze, anisole and the like, and an organic solvent such as cyclohexanone, tetrahydrofuran, limonene, propylene glycol monoethyl ether acetate and the like. Among them, the chlorine-containing organic solvent or the aromatic organic solvent is preferably used, and dichloromethane and chloroform are more preferably used. The uniformity of the catalytic solution is improved by selecting these as a solvent, and after the solution is applied and dried, the catalyst favorably dispersed is easily disposed on the surface of the substrate.

The concentration of the nitrogen-containing dendrimer coordinating the metal element in the catalytic solution is not particularly limited, but is preferably 5.0 µmol/L or less, more preferably $1.0 \times 10^{-1}$ µmol/L or less, particularly preferably $1.0 \times 10^{-2}$ µmol/L or less and most preferably $1.0 \times 10^{-7}$ µmol/L or less.

Further, when the catalyst is attached to the surface of the substrate, a patterned mask may be previously formed on the surface of the substrate. The mask is formed not to cover a point which forms carbon nanotubes, while covering a point which does not form carbon nanotubes, on the surface of the substrate. Methods for forming a patterned mask are not particularly limited, and a method for using a plate on which a hole is formed at a point which forms carbon nanotubes, a method for applying a known resist composition on the surface of a substrate to perform patterning by a photolithography method or the like may be exemplified.

Thermal Decomposition Process

Subsequently, the thermal decomposition process will be described. This process is a process of thermally decomposing a carbon compound in the vicinity of a substrate to which the catalyst is attached while supplying the carbon compound to the surface of the substrate, and forming carbon nanotubes by a vapor deposition method. Carbon nanotubes are produced at a point on which the metal element included in the catalyst is present on the surface of the substrate by performing this process. That is, the thermally decomposed carbon compound is converted into carbon nanotubes by being brought in contact with the metal element included in the catalyst.

The carbon compound is not particularly limited as long as the compound may be vaporized. Examples of the carbon compound include alcohol such as methanol, ethanol, isopropanol and the like, a chain hydrocarbon such as methane, ethane, propane, ethylene, acetylene and the like, a cyclic hydrocarbon such as cyclohexane and the like, an aromatic hydrocarbon such as benzene, toluene and the like, ketones such as acetone, cyclohexanone and the like. Among them, alcohol is preferably exemplified and ethanol is particularly preferably exemplified.

In the thermal decomposition process, while a substrate carried in a chamber is heated, a vaporized carbon compound is brought in contact with the heated substrate. When the carbon compound is brought in contact with the substrate, the vaporized carbon compound itself may be brought in contact with the substrate, and an inert gas such as nitrogen, argon, helium and the like may be used as a carrier to bring a mixed gas of the vaporized carbon compound and the carrier in contact with the substrate. In any case, it is necessary to bring the carbon compound in contact with the face of the side to which the catalyst is attached, on the surface of the substrate. The carbon compound brought in contact with the substrate is thermally decomposed in the vicinity of the substrate by heat of the substrate and converted into carbon nanotubes by the metal element included in the catalyst.

The temperature of the substrate in the thermal decomposition process is preferably from 500° C. to 1000° C. and more preferably from 600° C. to 900° C. In addition, means of heating the substrate is not particularly limited, and a method for directly bringing the substrate in contact with a heater, a method for induction heating the substrate by using a high frequency coil, a method for heating the substrate by irradiating infrared light on the substrate, or the like may be exemplified. Furthermore, in order to reduce effects of the atmosphere present around the substrate, it is preferred that the pressure inside the chamber is reduced.

Carbon nanotubes are formed on the surface of the substrate by performing the thermal decomposition process. These carbon nanotubes are formed by using the metal element disposed into a nano-level pitch as a base point by the nitrogen-containing dendrimer compound, and thus each carbon nanotube is formed in a state of being arranged into a nano-level pitch.

Catalyst for Producing Carbon Nanotubes

As described above, the compound in which a transition metal element of 8, 9 or 10 Group is coordinated to the nitrogen-containing dendrimer compound is useful as a catalyst for producing carbon nanotubes. The catalyst for producing carbon nanotubes is also one example of the present invention. The catalyst for producing carbon nanotubes has been as described above, and thus the description thereof will not be repeated here.

The method for preparing carbon nanotubes and catalyst for producing carbon nanotubes of the present invention have been described above by showing an embodiment of the present invention, but the present invention is not limited to the embodiment, and may be carried out by suitable modifications within the scope of the present invention.

For example, a phenyl azomethine dendrimer compound has been described as a nitrogen-containing dendrimer compound in the above embodiments, but other nitrogen-containing dendrimer compounds may be used. Examples of the nitrogen-containing dendrimer compound include a polyamidoamine dendrimer (PAMAM), a carbazole dendrimer and the like.

EXAMPLES

Hereinafter, the present invention will be described in more detail by showing examples. However, the present invention is not limited to the following examples.

Synthesis of Phenyl Azomethine Dendrimer

Synthesis of 2nd Generation Phenyl Azomethine Dendron Precursor (Pre-G2on)

Benzophenone (4.62 g, 25.3 mmol), 4,4'-diaminodiphenyl methane (2.5 g, 12.6 mmol) and 1,4-diazabicyclo [2.2.2] octane (DABCO) (8.49 g, 75.7 mmol) were weighed out, with which the septum of a 100 mL three-necked flask was charged and blocked, and the flask was purged with nitrogen. 50 mL of chlorobenzene was added thereto, the resulting mixture was stirred while being heated by an oil bath (125° C.), and the raw materials were dissolved. Titanium tetrachloride (2.01 mL, 1.84 mL) dissolved in chlorobenzene (2 mL) was added dropwise thereto from a dropping funnel, and the remaining titanium tetrachloride was washed with 2 mL of chlorobenzene. Thereafter, the content fluid was reacted for 4 hours, it was confirmed that the reaction had been completed by thin-layer chromatography (TLC), and then titanium tetrachloride was inactivated by stirring the three-necked flask for several hours while the flask was open. The inactivated titanium tetrachloride was removed by filtering the content with a celite, the celite was washed with chlorobenzen, then the solvent was distilled off from the recovered filtrate and purified by silica gel column chromatography (as an eluent, a mixture, in which 2 mass % of triethylamine was added to a mixed solvent of chloroform:hexane:ethyl acetate=4:4:1, was used), and the solvent was distilled off to obtain a 2nd generation phenyl azomethine dendron precursor (Pre-G2on), which is a target material.

Synthesis of 2nd Generation Phenyl Azomethine Dendron (G2on)

Pre-G2on (2.17 g, 3.98 mmol), potassium permanganate (1.19 g, 7.5 mmol) and tetra-n-butylammonium bromide (2.42 g, 7.5 mmol) were weighed out and placed in an eggplant flask, and dichloroethane (25 mL) was added thereto and the resulting mixture was stirred while the container was dipped in a water bath. After 1 hour, the water bath was removed and reaction was performed for 2 days. After the reaction was completed, a saturated NaHSO$_3$ aqueous solution was further added thereto to inactivate the potassium permanganate, liquid separation was performed with a saturated saline solution to which 2 wt % of triethylamine was added, and tetra-n-butylammonium bromide was removed. After the liquid separation, the organic layer was dried by sodium sulfate, and then the solvent was distilled off. Thereafter, purification was performed by silica gel column chromatography (as an eluent, a mixture, in which 2 mass % of triethylamine was added to a mixed solvent of chloroform:hexane:ethyl acetate=4:4:1, was used), and the solvent was distilled off to obtain a 2nd generation phenyl azomethine dendron (G2on), which was a target material. Synthesis of 3rd generation phenyl azomethine dendron precursor (Pre-G3on)

G2on (5.161 g, 9.55 mmol), 4,4'-diaminodiphenyl methane (0.901 g, 4.54 mmol) and DABCO (8.49 g, 7.57 mmol) were weighed out, with which the septum of a 100 mL three-necked flask was charged and blocked, and the flask was purged with nitrogen. 50 mL of chlorobenzene was added thereto, the resulting mixture was stirred while being heated by an oil bath (125° C.), and the raw materials were dissolved. Titanium tetrachloride (2.01 mL, 1.84 mL) dissolved in chlorobenzene (2 mL) was added dropwise thereto from a dropping funnel, and the remaining titanium tetrachloride was washed with 2 mL of chlorobenzene. Thereafter, the content fluid was reacted for 4 hours, it was confirmed that the reaction had been completed by thin-layer chromatography (TLC), and then titanium tetrachloride was inactivated by stirring the three-necked flask for several hours while the flask was open. The inactivated titanium tetrachloride was removed by filtering the content with celite, the celite was washed with chlorobenze, then the solvent was distilled off from the recovered filtrate and purified by silica gel column chromatography (as an eluent, a mixture, in which 2 mass % of triethylamine was added to a mixed solvent of chloroform:hexane:ethyl acetate=3:3:1, was used), and the solvent was distilled off to obtain a 3rd generation phenyl azomethine dendron precursor (Pre-G3on), which was a target material.

Synthesis of 3rd Generation Phenyl Azomethine Dendron (G3on)

Pre-G3on (1.27 g, 1.02 mmol), potassium permanganate (0.95 g, 6.0 mmol) and tetra-n-butylammonium bromide (1.95 g, 6.1 mmol) were weighed out and placed in an eggplant flask, and dichloroethane (25 mL) was added thereto and the resulting mixture was stirred while the container was dipped in a water bath. After 1 hour, the water bath was removed and reaction was performed for 3 days. After the reaction was completed, a saturated NaHSO$_3$ aqueous solution was further added thereto to inactivate the potassium permanganate, liquid separation was performed with a saturated saline solution to which 2 mass % of triethylamine was added, and tetra-n-butylammonium bromide was removed. After the liquid separation, the organic layer was dried by sodium sulfate, and then the solvent was distilled off. Thereafter, purification was performed by silica gel column chromatography (as an eluent, a mixture, in which 2 mass % of triethylamine was added to a mixed solvent of chloroform:hexane:ethyl acetate=3:3:1, was used), and the solvent was distilled off to obtain a 3rd generation phenyl azomethine dendron (G3on), which was a target material.

Synthesis of 4th Generation Phenyl Azomethine Dendron Precursor (Pre-G4on)

G3on (4.90 g, 3.9 mmol), 4,4'-diaminodiphenyl methane (0.387 g, 1.95 mmol) and DABCO (1.31 g, 11.7 mmol) were weighed out, with which the septum of a 100 mL three-necked flask was charged and blocked, and the flask was purged with nitrogen. 20 mL of chlorobenzene was added thereto, the resulting mixture was stirred while being heated by an oil bath (125° C.), and the raw materials were dissolved. Titanium tetrachloride (0.32 mL, 2.93 mL) dissolved in chlorobenzene (2 mL) was added dropwise thereto from a dropping funnel, and the remaining titanium tetrachloride was washed with 2 mL of chlorobenzene. Thereafter, the content fluid was reacted for 4 hours, it was confirmed that the reaction had been completed by thin-layer chromatography (TLC), and then titanium tetrachloride was inactivated by stirring the three-necked flask for several hours while the flask was open. The inactivated titanium tetrachloride was removed by filtering the content with a celite, the celite was washed with chlorobenze, then the solvent was distilled off from the recovered filtrate and purified by silica gel column chromatography (as an eluent, a mixture, in which 2 mass % of triethylamine was added to a mixed solvent of chloroform:hexane:ethyl acetate=2:2:1, was used), and the solvent was distilled off to obtain a 4th generation phenyl azomethine dendron precursor (Pre-G4on), which was a target material.

Synthesis of 4th Generation Phenyl Azomethine Dendron (G4on)

Pre-G4on (4.62 g, 3.67 mmol), potassium permanganate (3.33 g, 21 mmol) and tetra-n-butylammonium bromide (6.78 g, 21 mmol) were weighed out and placed in an eggplant flask, and dichloroethane (25 mL) was added thereto and the resulting mixture was stirred while the container was dipped in a water bath. After 1 hour, the water bath was removed and reaction was performed for 7 days. After the reaction was completed, a saturated $NaHSO_3$ aqueous solution was further added thereto to inactivate the potassium permanganate, liquid separation was performed with a saturated saline solution to which 2 mass % of triethylamine was added, and tetra-n-butylammonium bromide was removed. After the liquid separation, the organic layer was dried by sodium sulfate, and then the solvent was distilled off. Thereafter, purification was performed by silica gel column chromatography (as an eluent, a mixture, in which 2 mass % of triethylamine was added to a mixed solvent of chloroform:hexane:ethyl acetate=3:3:1, was used), then the solvent was distilled off, the solid obtained was prepared into a chloroform solution (10 mass %), then purification was performed by HPLC, and the solvent was distilled off. The solid obtained was prepared into a chloroform solution (10 mass %), re-precipitation was performed in the presence of 10-fold diluted ethanol, and the solid obtained was recovered by filtration under reduced pressure to obtain a 4th generation phenyl azomethine dendron (G4on), which was a target material.

Synthesis of 4th Generation Phenyl Azomethine Dendrimer (DPAG4er)

p-phenylenedianiline (10.2 mg), G4on (500 mg) and DABCO (245.5 mg) were weighed out and placed in a reaction vessel, vacuum degassing was performed, then with which the septum of the vessel was charged and blocked, and the vessel was purged with nitrogen. 20 mL of chlorobenzene was added thereto, the resulting mixture was stirred while being heated by an oil bath (125° C.), and the raw materials were dissolved. Titanium tetrachloride (0.06 mL, 0.547 mL) dissolved in chlorobenzene (2 mL) was added dropwise thereto from a dropping funnel, and the remaining titanium tetrachloride was washed with 2 mL of chlorobenzene. Thereafter, the content fluid was reacted for 4 hours, it was confirmed that the reaction had been completed by thin-layer chromatography (TLC), and then titanium tetrachloride was inactivated by stirring the three-necked flask for several hours while the flask was open. The inactivated titanium tetrachloride was removed by filtering the content with a celite, the celite was washed with chlorobenze, then the solvent was distilled off from the recovered filtrate and purified by silica gel column chromatography (as an eluent, a mixture, in which 2 mass % of triethylamine was added to a mixed solvent of chloroform:hexane:ethyl acetate=2:2:1, was used), the solvent was distilled off, the solid obtained was prepared into a chloroform solution (10 mass %), then purification was performed by HPLC, and the solvent was distilled off. The solid obtained was prepared into a chloroform solution (10 mass %), re-precipitation was performed in the presence of 10-fold diluted methanol, and the solid obtained was recovered by filtration under reduced pressure to obtain a 4th generation phenyl azomethine dendrimer (DPAG4er), which was a target material.

Preparation of Catalytic Solution

Synthesis of 4th Generation Phenyl Azomethine Dendrimer Iron 14 Equivalent Complex (DPAG4er+14Fe)

Concentration 1 µmol/L

DPAG4er was weighed 0.2725 mg and placed in a 10 mL measuring flask, and a dehydrated chloroform/acetonitrile mixed solvent (mixing ratio 1:1 (volume ratio)) was added thereto to prepare 10 mL of a solution. Hereinafter, the solution will be referred to as the D solution. Separately, $FeCl_3$ (dehydrated) was weighed 4.9 mg and placed in a 5 mL measuring flask, and dehydrated acetonitrile was added thereto to prepare 5 mL of a solution. Hereinafter, the solution will be referred to as the iron solution. 3 mL of the D solution was transferred to a UV cell and the iron solution was added dropwise thereto by 1 equivalent (2.5 µL). Each time the solution was added dropwise thereto, a sum of 14 equivalents of the iron solution was added dropwise thereto while the UV spectrum of the solution was measured. It was confirmed by the presence of isosbestic points in the UV spectrum measurement that 14 iron atoms were included per one DPAG4er molecule. Thereafter, the solvent was distilled off from the solution, dehydrated chloroform was added to the solid obtained (DPAG4er+14Fe), and a 5 µM solution was prepared. Impurities were filtered by filtration, and then chloroform was added thereto to dilute the solution to 1 µmol/L. After the dilution, filtration was performed again to obtain a chloroform solution of DPAG4er+14Fe. This solution was used as a catalytic solution in Example 1.

Synthesis of 4th Generation Phenyl Azomethine Dendrimer Iron 14 Equivalent Complex (DPAG4er+14Fe)

Concentration $5.0 \times 10^{-8}$ µmol/L

A dehydrated chloroform solution of DPAG4er+14Fe at a concentration of 5 µM was prepared in the same manner as in the Preparation Example of a catalytic solution including DPAG4er+14Fe at a concentration of 1 µmol/L. The dehydrated chloroform solution of DPAG4er+14Fe obtained at a concentration of 5 µM was diluted by chloroform to obtain a chloroform solution of DPAG4er+14Fe at a concentration of $5.0 \times 10^{-8}$ µmol/L. This solution was used as a catalytic solution in Example 2.

Synthesis of 4th Generation Phenyl Azomethine Dendrimer Iron 2 Equivalent Complex (DPAG4er+2Fe)

Concentration $5.0 \times 10^{-8}$ µmol/L

A chloroform solution of DPAG4er+2Fe at a concentration of $5.0 \times 10^{-8}$ µmol/L was obtained in the same manner as in the catalytic solution including DPAG4er+14Fe at a concentration of $5.0\times10^{-8}$ μmol/L, except that the amount of a dehydrated acetonitrile solution of $FeCl_3$ (dehydrated) dropped in the D solution was 2 equivalents for DPAG4er. This solution was used as a catalytic solution in Example 3.

Example 1

A catalytic solution including DPAG4er+14Fe at a concentration of 1 μmol/L, which had been prepared by the above method, was applied on the surface of a silicon substrate hydrophobically treated with hexamethylene disilazane (HMDS) by a spin coat method, then chloroform was evaporated, and a catalytic membrane was formed on the surface of the silicon substrate. This silicon substrate was carried in a desktop type carbon nanotube producing apparatus (manufactured by Microphase Corp., trade name MPCNT-Basic) such that the face with the catalytic membrane formed became the upper side, and a vacuum pump was operated to allow the pressure in the chamber to reach 50 Torr. Subsequently, ethanol (about 50 mL) carried below the substrate was heated to 1000° C. to be vaporized while the substrate was heated to 820° C. with a heater. The state was maintained for from 10 minutes to 15 minutes, the substrate was taken out from the inside of the chamber, and the surface of the substrate was observed by scanning electron microscope (SEM) and as a result, it was confirmed that a single layer of carbon nanotubes was produced on the surface of the substrate.

Comparative Example 1

The silicon substrate hydrophobically treated with HMDS was carried as it was in a desktop type carbon nanotube producing apparatus (manufactured by Microphase Corp., trade name MPCNT-Basic), and a vacuum pump was operated to allow the pressure in the chamber to reach 7 Torr. Subsequently, the substrate was heated to 820° C. with a heater while acetylene gas was introduced into the chamber at a flow rate of 47 sccm. The state was maintained for from 10 minutes to 15 minutes and the substrate was taken out from the inside of the chamber, but nothing was attached to the surface of the substrate and no product was confirmed.

Comparative Example 2

Ferrous chloride (about 20 g) in powder form was carried on the surface of a silicon substrate hydrophobically treated with HMDS, the silicon substrate was carried in a desktop type carbon nanotube producing apparatus (manufactured by Microphase Corp., trade name MPCNT-Basic) such that the face with ferrous chloride carried became the upper side, and a vacuum pump was operated to allow the pressure in the chamber to reach from 15 Torr to 20 Torr. Subsequently, the substrate was heated to 820° C. with a heater while acetylene gas was introduced into the chamber at a flow rate of 47 sccm. Ferrous chloride carried on the surface of the substrate was vaporized by sublimation by the heating. The state was maintained for from 10 minutes to 15 minutes, and the substrate was taken out from the inside of the chamber. Deposits were observed on the surface of the substrate obtained, but from the observation by scanning electron microscope (SEM), it was confirmed that the deposits were not carbon nanotubes.

Comparative Example 3

Ferrous chloride (about 20 g) in powder form was carried on the surface of a silicon substrate hydrophobically treated with HMDS, the silicon substrate was carried in a desktop type carbon nanotube producing apparatus (manufactured by Microphase Corp., trade name MPCNT-Basic) such that the face with ferrous chloride carried became the upper side, and a vacuum pump was operated to allow the pressure in the chamber to reach 50 Torr. Subsequently, ethanol (about 50 mL) carried below the substrate was heated to 1000° C. to be vaporized while the substrate was heated to 820° C. with a heater. The state was maintained for from 10 minutes to 15 minutes, and the substrate was taken out from the inside of the chamber. Deposits were confirmed on the surface of the substrate obtained, but from the observation by scanning electron microscope (SEM), it was confirmed that the deposits were not carbon nanotubes. Furthermore, Comparative Example 3 is a result obtained by performing a test in the same order as in Example 1, except that ferrous chloride was carried instead of forming the catalytic membrane of the present invention on the surface of the substrate.

As apparent from what have been described above, it is understood that a single layer of carbon nanotubes may be produced on the surface of the substrate by using the catalyst in the present invention. Further, from the fact that carbon nanotubes were not produced in Comparative Examples 2 and 3 in which an iron compound (iron chloride) was used, it can be known that the production of carbon nanotubes is not just an effect of the metal element itself, but an effect of the catalyst of the present invention. In addition, the catalyst of the present invention consisting of a nitrogen-containing dendrimer compound including a metal element is disposed into a nano-level pitch as described above, and thus a single layer of carbon nanotubes may be produced into a nano-level pitch on the surface of the substrate.

Example 2

A catalytic solution including DPAG4er+14Fe at a concentration of $5.0\times10^{-8}$ μmol/L, which had been prepared by the above method, was applied on the surface of a silicon substrate hydrophobically treated with HMDS by a spin coat method, then chloroform was evaporated, and a catalytic membrane was formed on the surface of the silicon substrate. This silicon substrate was carried in a desktop type carbon nanotube producing apparatus (manufactured by Microphase Corp., trade name MPCNT-Basic) such that the face with the catalytic membrane formed became the upper side, and a vacuum pump was operated to allow the pressure in the chamber to reach 50 Torr. Subsequently, ethanol (about 50 mL) carried below the substrate was heated to 1000° C. to be vaporized while the substrate was heated to 820° C. with a heater. The state was maintained for from 10 minutes to 15 minutes, the substrate was taken out from the inside of the chamber, and the surface of the substrate was observed by scanning electron microscope (SEM), and as a result, it was confirmed that a single layer of carbon nanotubes was produced on the surface of the substrate. The diameter of carbon nanotubes measured by a SEM observation image was found to be 19 nm.

Example 3

The treatment of the substrate by the desktop type carbon nanotube producing apparatus (manufactured by Microphase Corp., trade name MPCNT-Basic) was performed in the same manner as in Example 2, except that the catalytic solution including DPAG4er+14Fe at a concentration of $5.0\times10^{-8}$ μmol/L was changed into a catalytic solution including DPAG4er+2Fe at a concentration of $5.0\times10^{-8}$ μmol/L, which had been prepared by the above method. The substrate was taken out from the inside of the chamber, and the surface of the substrate was observed by scanning electron microscope (SEM), and as a result, it was confirmed that a single layer of carbon nanotubes was produced on the surface of the substrate. The diameter of carbon nanotubes measured by a SEM observation image was found to be 8 nm.

According to Examples 2 and 3, it can be known that the diameter of carbon nanotubes produced may be reduced by decreasing the coordination number of the metal element for the nitrogen-containing dendrimer compound. That is, according to Examples 2 and 3, it can be known that the diameter of carbon nanotubes produced may be adjusted by adjusting the coordination number of the metal element for the nitrogen-containing dendrimer compound.

What is claimed is:

1. A method for preparing carbon nanotubes, comprising: attaching a catalyst consisting of a compound in which a transition metal element of Group 8, 9 or 10 is coordinated to a nitrogen-containing dendrimer compound having at least one nitrogen atom, to which a metal element may be coordinated, on a surface of a substrate; and thermally decomposing a carbon compound in the vicinity of the substrate while supplying the carbon compound on the surface of the substrate to which the catalyst is attached, wherein the nitrogen-containing dendrimer compound is a phenyl azomethine dendrimer compound represented by the following general formula (1):

$$AB_nR_m \quad (1)$$

wherein the A in general formula (1) is a core molecular group of the phenyl azomethine dendrimer and represented by a structure of the following formula:

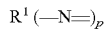

wherein the $R^1$ represents an aromatic group that may have a substituent, p represents the number of bonds to the $R^1$, and the B in general formula (1) is represented by a structure of the following formula:

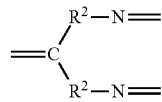

in which one azomethine bond is formed for the A, the $R^2$ represents an aromatic group that may have the same or different substituent;

the R in general formula (1) is represented by a structure of the following formula:

in which an azomethine bond is formed to the B as a terminal group, and the $R^3$ represents an aromatic group that may have the same or different substituent;

the n represents a generation number through a structure of the B of the phenyl azomethine dendrimer; and the m represents the number of terminal groups R of the phenyl azomethine dendrimer, m=p when n=0, and m=$2^n$p when n≥1.

2. The method of claim 1, wherein the metal element coordinated to the nitrogen-containing dendrimer compound is iron.

3. The method of claim 1, wherein the carbon compound is alcohol.

* * * * *